US012051388B2

(12) United States Patent
Wu et al.

(10) Patent No.: US 12,051,388 B2
(45) Date of Patent: Jul. 30, 2024

(54) TRANSMITTER DEVICE

(71) Applicant: BENQ CORPORATION, Taipei (TW)

(72) Inventors: Chen-Chi Wu, Taipei (TW); Chin-Fu Chiang, Taipei (TW); Chun-Han Lin, Taipei (TW); Chia-Nan Shih, Taipei (TW); Jung-Kun Tseng, Taipei (TW); Chuang-Wei Wu, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 18/169,154

(22) Filed: Feb. 14, 2023

(65) Prior Publication Data

US 2024/0038196 A1 Feb. 1, 2024

(30) Foreign Application Priority Data

Jul. 29, 2022 (TW) .................................. 111128685

(51) Int. Cl.
*G09G 5/00* (2006.01)

(52) U.S. Cl.
CPC ....... *G09G 5/006* (2013.01); *G09G 2370/047* (2013.01); *G09G 2370/12* (2013.01); *G09G 2370/16* (2013.01)

(58) Field of Classification Search
None
See application file for complete search history.

(56) References Cited

U.S. PATENT DOCUMENTS

2017/0017283 A1* 1/2017 Seo ........................... G06F 3/16
2019/0369738 A1 12/2019 Lee
2020/0184921 A1* 6/2020 Yong ..................... G06F 3/1423
2020/0226087 A1 7/2020 Sun
2021/0203876 A1 7/2021 You et al.
2021/0203884 A1 7/2021 You et al.
2021/0312881 A1* 10/2021 Kamekura ............. G09G 5/006
2022/0224962 A1* 7/2022 Candelore .......... H04N 21/4183

FOREIGN PATENT DOCUMENTS

TW 202004417 1/2020

OTHER PUBLICATIONS

"Office Action of Taiwan Counterpart Application", issued on Mar. 28, 2023, p. 1-p. 9.

* cited by examiner

*Primary Examiner* — Joseph R Haley

(57) ABSTRACT

A transmitter device adapted to be coupled to an image providing device and a receiver device includes first and second conversion units, a wireless module, and a processing unit. The first conversion unit and the second conversion unit are configured to be coupled to the image providing device through an HDMI transmission cable and a Type-C transmission cable, respectively, so as to respectively receive a first video and audio stream and a second video and audio stream provided by the image providing device. The wireless module is connected to the receiver device through wireless communication. The processing unit preferentially selects the first conversion unit to receive a first video and audio signal output by converting the first video and audio stream by the first conversion unit and transmits the first video and audio signal to the receiver device through the wireless module.

9 Claims, 2 Drawing Sheets

TRANSMITTER DEVICE

CROSS-REFERENCE TO RELATED APPLICATION

This application claims the priority benefit of Taiwan application serial no. 111128685, filed on Jul. 29, 2022. The entirety of the above-mentioned patent application is hereby incorporated by reference herein and made a part of this specification.

BACKGROUND

Technical Field

The disclosure relates to a video and audio streaming technology; more particularly, the disclosure relates to a transmitter device.

Description of Related Art

A transmitter device in a general video and audio streaming system usually supports one single transmission interface in most cases to receive a video and audio stream provided by a video and audio providing device. Therefore, if the video and audio providing device does not support the same transmission interface as that of the transmitter device, the video and audio streaming step cannot be performed.

SUMMARY

The disclosure provides a transmitter device which may receive a video and audio stream provided by an image providing device through coupling a high definition multimedia interface (HDMI) transmission cable and a Type-C transmission cable to the image providing device.

According to an embodiment of the disclosure, a transmitter device adapted to be coupled to an image providing device and a receiver device is provided. The transmitter device includes a first conversion unit, a second conversion unit, a wireless module, and a processing unit. The first conversion unit is configured to be coupled to the image providing device through an HDMI transmission cable to receive a first video and audio stream provided by the image providing device. The second conversion unit is configured to be coupled to the image providing device through a Type-C transmission cable to receive a second video and audio stream provided by the image providing device. The wireless module is connected to the receiver device through wireless communication. The processing unit preferentially selects the first conversion unit to receive a first video and audio signal output by converting the first video and audio stream by the first conversion unit, and the processing unit transmits the first video and audio signal to the receiver device through the wireless module.

In view of the above, the transmitter device provided in one or more embodiments of the disclosure may be coupled to the image providing device through the HDMI transmission cable and the Type-C transmission cable, and the transmitter device may preferentially select the video and audio stream transmitted through the HDMI transmission cable and further provided the video and audio stream transmitted through the HDMI transmission cable to the receiver device through wireless communication.

In order to make the above-mentioned features and advantages of the disclosure comprehensible, embodiments accompanied with drawings are described in detail below.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DESCRIPTION OF THE EMBODIMENTS

Figure 1:
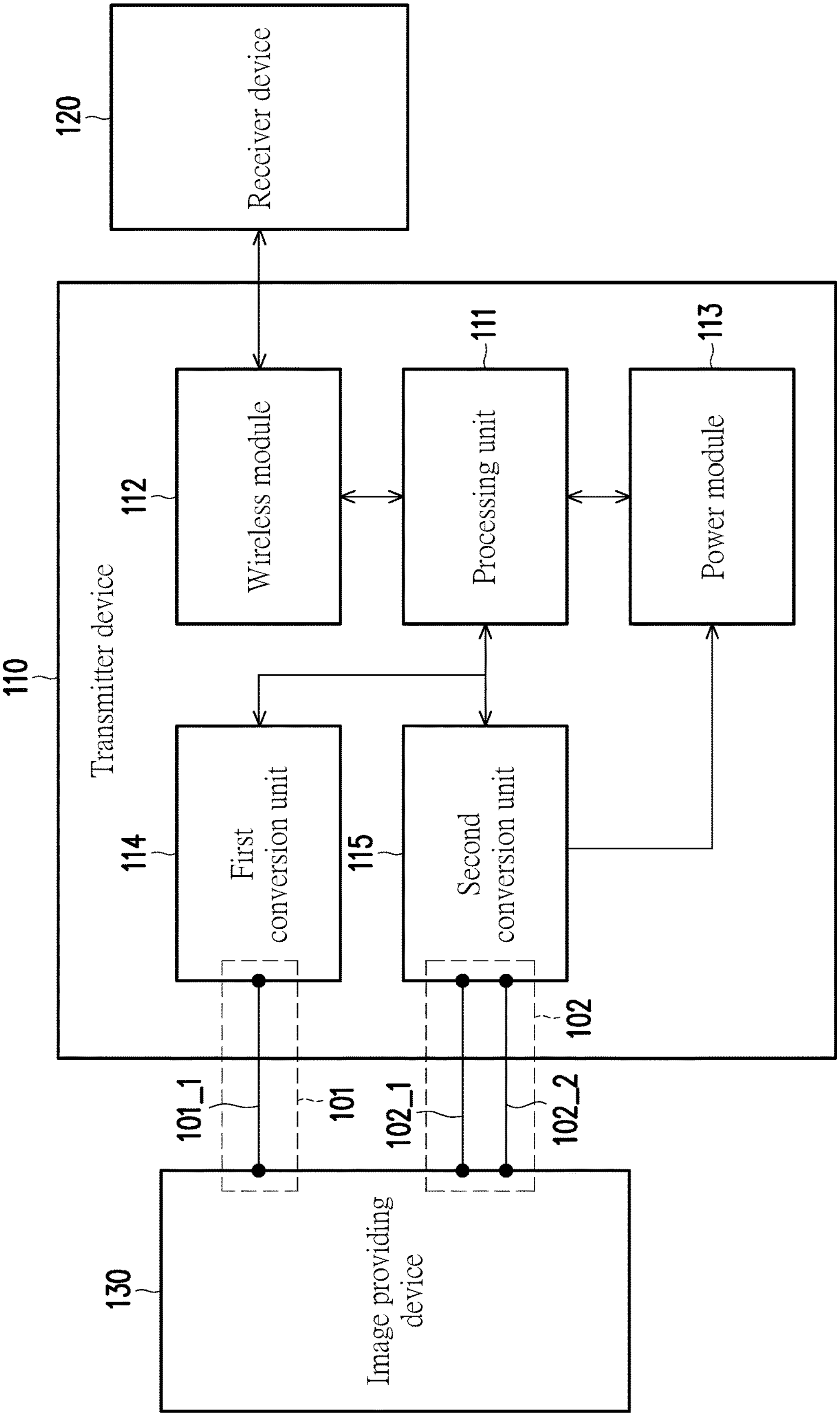
FIG. 1 is a schematic view of a transmitter device according to an embodiment of the disclosure.

Reference will now be made in detail to the exemplary embodiments of the disclosure, and examples of the exemplary embodiments are illustrated in the accompanying drawings. Whenever possible, the same reference numbers marking the corresponding elements/components/steps are used in the drawings and descriptions to indicate the same or similar parts.

FIG. 1 is a schematic view of a transmitter device according to an embodiment of the disclosure. With reference to FIG. 1, a transmitter device 110 adapted to be coupled to a receiver device 120 and an image providing device 130 is provided. The transmitter device 110 and the receiver device 120 may constitute a video and audio streaming system. The receiver device 10 may be connected to a display module (e.g., a display or a projector) through a cable or in a wireless manner. The display module may, for instance, include one or a plurality of displays (splicing screens) or projectors and other apparatuses. In this embodiment, the transmitter device 110 may obtain a video and audio stream from the image providing device 130 and provide a corresponding video and audio signal to the receiver device 120, so that the receiver device 120 may further provide the video and audio signal to the display module for playing videos and audios. Besides, the receiver device 120 may be actually connected to one or a plurality of receiver devices 120. For instance, the transmitter device 110 and the receiver device 120 may be implemented as a conference system. A user may provide video and audio data corresponding to the video and audio content to be played to the display module through the image providing device 130, and the video and audio data are provided to the display module through the transmitter device 110 and the receiver device 120.

In this embodiment, the transmitter device 110 includes a processing unit 111, a wireless module 112, a power module 113, a first conversion unit 114, and a second conversion unit 115. The processing unit 110 is coupled to the wireless module 112, the power module 113, the first conversion unit 114, and the second conversion unit 115. The power module 113 is further coupled to the second conversion unit 115. In this embodiment, the first conversion unit 114 is coupled to the image providing device 130 through an HDMI transmission cable 101. The HDMI transmission cable 101 includes a video and audio stream channel 101_1. The second conversion unit 115 is coupled to the image providing device 130 through a Type-C (or referred to as universal serial bus Type-C, USB Type-C) transmission cable 102. The Type-C transmission cable 102 includes a video and audio stream channel 102_1 and a power channel 102_2. In this embodiment, the wireless module 112 is connected to the receiver device 120 through wireless communication.

In this embodiment, when the transmitter device 110 is coupled to the image providing device 130 through the HDMI transmission cable 101 and the Type-C transmission cable 102 at the same time, the first conversion unit 114 receives a first video and audio stream provided by the image providing device 130 through the video and audio stream channel 101_1 of the HDMI transmission cable 101, and the second conversion unit 115 receives a second video and audio stream provided by the image providing device 130 through the video and audio stream channel 102_1 of the Type-C transmission cable 102. In this embodiment, the processing unit 110 preferentially selects the first conversion unit 114 to receive a first video and audio signal output by converting the first video and audio stream by the first conversion unit 114, and the processing unit 110 transmits the first video and audio signal to the receiver device 120 through the wireless module 112. In other words, when the transmitter device 110 is coupled to the image providing device 130 through the HDMI transmission cable 101 and the Type-C transmission cable 102 at the same time, the transmitter device 110 preferentially selects the first video and audio stream transmitted through the HDMI transmission cable 101. Specifically, the processing unit 110 may first perform data compression on the first video and audio signal to generate and provide a compressed stream to the wireless module 112, and the wireless module 112 may transmit the compressed stream to the receiver device 120 in form of a wireless packet.

In this embodiment, the processing unit 111 further enables the power channel 102_2 of the Type-C transmission cable 102 through the second conversion unit 115, so that the second conversion unit 115 obtains a power signal from the image providing device 130 through the power channel 102_2 and provides the power signal to the power module 113. As such, the transmitter device 110 may obtain power through the Type-C transmission cable 102. The power module 113 may include related power circuits and may provide power required by driving (or enabling) the transmitter device 110 to operate to the processing unit 111 of the transmitter device 110 and other related functional circuits.

In this embodiment, when the transmitter device 110 is coupled to the image providing device 130 through the HDMI transmission cable 101 and the Type-C transmission cable 102 at the same time, the transmitter device 110 preferentially selects the first video and audio stream transmitted through the HDMI transmission cable 101 and continuously uses the power signal provided by the image providing device 130 through the Type-C transmission cable 102.

In this embodiment, the first conversion unit 114 and the second conversion unit 115 may be two different data processing chips, respectively, but the first conversion unit 114 and the second conversion unit 115 may be, for instance, formed on the same circuit substrate. The first conversion unit 114 and the second conversion unit 115 may be respectively configured to process the video and audio data on the received video and audio stream and generate the corresponding video and audio signal, which may also be referred to as a mobile industry processor interface (MIPI) signal. In some embodiments of the disclosure, the first video and audio stream and the second video and audio stream may, for instance, have the same stream data content and may be configured to display the same video and audio content, and the difference lies in that implementation manner, i.e., the use of different video and audio streaming formats (referring to the data transmission format that supports an HDMI interface and a Type-C interface, respectively) and/or different image resolutions.

For instance, the image providing device 130 may transmit the same video and audio content as the first video and audio stream and the second video and audio stream respectively in the HDMI data format and the Type-C data format to the first conversion unit 114 and the second conversion unit 115 through the HDMI transmission cable 101 and the Type-C transmission cable 102, respectively. The first conversion unit 114 may convert the first video and audio stream in the HDMI data format to the first video and audio signal and provide the first video and audio signal to the processing unit 111. The second conversion unit 115 may convert the second video and audio stream in the Type-C data format to the second video and audio signal and provide the second video and audio signal to the processing unit 111.

Note that the preferential selection of the HDMI transmission cable 101 as described above indicates that the transmitter device 110 may use the first video and audio stream received from the HDMI transmission cable 101 to provide the corresponding video and audio signal to the receiver device 120 without using the second video and audio stream received from the Type-C transmission cable 102 or without using the second video and audio stream to provide the corresponding video and audio signal. In this regard, various implementation manner will be described in detail below.

In some embodiments of the disclosure, when the processing unit 111 determines (or detects) that the transmitter device 110 is coupled to the image providing device 130 through the HDMI transmission cable 101 and the Type-C transmission cable 102 at the same time, the processing unit 111 may notify the second conversion unit 115 of stopping receiving the second video and audio stream provided by the image providing device 130 through the Type-C transmission cable 102, so as to effectively save the power of the transmitter device 110. Here, the processing unit 111 may disable the second conversion unit 115.

Alternatively, in other embodiments of the disclosure, when the processing unit 111 determines (or detects) that the transmitter device 110 is coupled to the image providing device 130 through the HDMI transmission cable 101 and the Type-C transmission cable 102 at the same time, the processing unit 111 may notify the second conversion unit 115 of not converting the second video and audio stream to the second video and audio signal but merely receive the video and audio stream.

Alternatively, in other embodiments of the disclosure, when the processing unit 111 determines (or detects) that the transmitter device 110 is coupled to the image providing device 130 through the HDMI transmission cable 101 and the Type-C transmission cable 102 at the same time, the second conversion unit 115 converts the second video and audio stream to the second video and audio signal and provides the second video and audio signal to the processing unit 111. However, the processing unit 111 receives the video and audio signal but does not provide the second video and audio signal to the wireless module 112. In this regard, although the processing unit 111 does not disable the second conversion unit 115, the processing unit 111 does not further provide the corresponding second video and audio signal to the wireless module 112.

Alternatively, in other embodiments of the disclosure, the transmitter device 110 may further include a first switch unit, and the first switch unit is coupled to a first signal transmission path between the processing unit 111 and the second conversion unit 115. Thereby, when the processing unit 111 determines (or detects) that the transmitter device 110 is coupled to the image providing device 130 through the HDMI transmission cable 101 and the Type-C transmission cable 102 at the same time, the processing unit 111 may operate the first switch unit to cut off the first signal transmission path configured to transmit the second video and audio signal between the processing unit 111 and the second conversion unit 115.

Alternatively, in other embodiments of the disclosure, the transmitter device 110 may further include a second switch unit, and the second switch unit is coupled to a second signal transmission path between the processing unit 111 and the wireless module 112. Thereby, when the processing unit 111 determines (or detects) that the transmitter device 110 is coupled to the image providing device 130 through the HDMI transmission cable 101 and the Type-C transmission cable 102 at the same time, the processing unit 111 may operate the second switch unit to cut off the second signal transmission path configured to transmit the second video and audio signal between the processing unit 111 and the wireless module 112.

In this embodiment, the image providing device 130 may be, for instance, a laptop computer, a desktop computer, a tablet computer, or any other similar computer device equipped with a central processor unit (CPU) and/or a graphics processing unit (GPU). The image providing device 130 is capable of supporting multiple screen outputs and is capable of outputting data streams of images and sounds.

In this embodiment, the processing unit 111 may be, for instance, a system on a chip (SOC). Alternatively, the processing unit 111 may, for instance, include a CPU or any other programmable general-purpose or special-purpose microprocessor, digital signal processor (DSP), programmable controller, application specific integrated circuit (ASIC), programmable logic device (PLD), any other similar processing device, or combinations of these devices.

In this embodiment, the transmitter device 110 may further include a storage unit, and the storage unit may be, for instance, a dynamic random access memory (DRAM), a flash memory, a non-volatile random access memory (NVRAM), etc. In addition, the receiver device 120 may further include a processing unit, a storage unit, and a wireless communication module, and the receiver device 120 may exchange extended display identification data with the display module. In this embodiment, the wireless module 112 may, for instance, include a WiFi communication interface, a Bluetooth wireless communication interface, or any other related communication circuit, which should however not be construed as a limitation in the disclosure.

In this embodiment, the processing unit 111 may generate (build) a plurality of virtual extended display identification data (EDID) and store the virtual EDID to the storage unit. The processing unit 111 may provide the virtual EDID to the image providing device 130 through the HDMI transmission cable 101 and the Type-C transmission cable 102. The image providing device 130 may automatically identify a plurality of virtual displays coupled to the image providing device 130 according to the received virtual EDID and may output a plurality of video and audio streams through the HDMI transmission cable 101. The virtual EDID may be the same or different configuration data.

In this embodiment, when the processing unit 111 determines (or detects) that the transmitter device 110 is coupled to the image providing device 130 through the HDMI transmission cable 101 and the Type-C transmission cable 102 at the same time, the processing unit 111 may provide first EDID data and second EDID data to the image providing device 130 through the HDMI transmission cable 101 and the Type-C transmission cable 102, respectively, so as to allow the image providing device 130 to provide the first video and audio stream and the second video and audio stream through the HDMI transmission cable 101 and the Type-C transmission cable 102 according to the first EDID data and the second EDID data, respectively. Here, the image providing device 130 is considered to be coupled to a plurality of displays (but as a matter of fact the image providing device 130 is coupled to one single transmitter device through the HDMI transmission cable 101 and the Type-C transmission cable 102).

Figure 2:
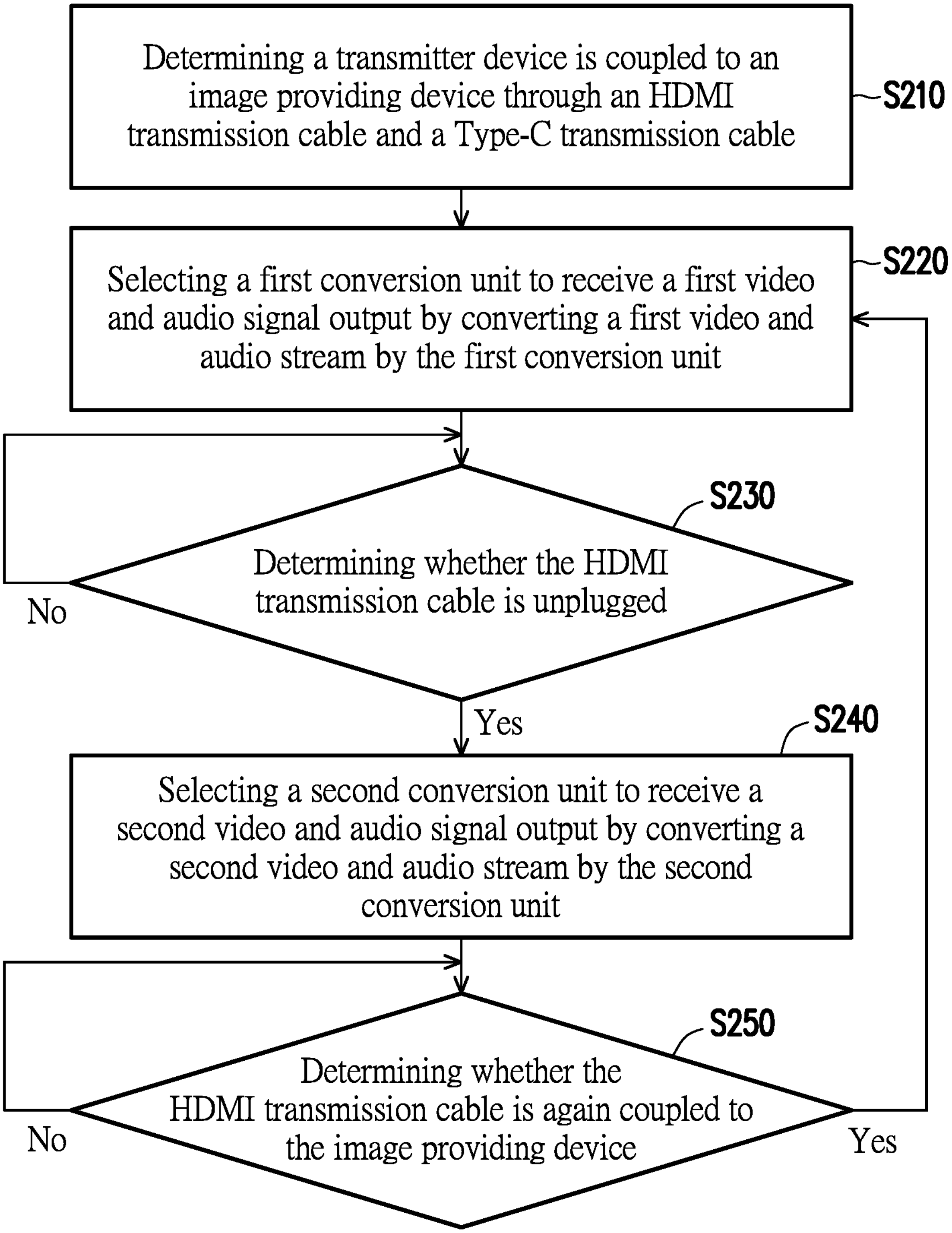
FIG. 2 is a flowchart of operating a transmitter device according to an embodiment of the disclosure.

FIG. 2 is a flowchart of operating a transmitter device according to an embodiment of the disclosure. With reference to FIG. 1 and FIG. 2, after the user connects the HDMI transmission cable and the Type-C transmission cable between the transmitter device 110 and the image providing device 130, the transmitter device 110 may perform following steps S210-S250. In step S210, the processing unit 111 determines that the transmitter device 110 is coupled to the image providing device 130 through the HDMI transmission cable 101 and the Type-C transmission cable 102. The image providing device 130 may provide the first video and audio stream and the second video and audio stream to the transmitter device 110 through the HDMI transmission cable 101 and the Type-C transmission cable 102.

In step S220, the processing unit 111 selects the first conversion unit 114 to receive the first video and audio signal output by converting the first video and audio stream by the first conversion unit 114. In step S230, the processing unit 111 determines whether the HDMI transmission cable 101 is unplugged. If not, the processing unit 111 may perform step S230 again after a first preset time period to periodically determine whether the HDMI transmission cable 101 is unplugged. If yes, the processing unit 111 performs step S240. In step S240, the processing unit 111 selects the second conversion unit 115 to receive the second video and audio signal output by converting the second video and audio stream by the second conversion unit 115. In other words, when the processing unit 111 determines that the HDMI transmission cable 101 is unplugged and not coupled to the image providing device 130, the processing unit 111 selects to use the second conversion unit 115, and the processing unit 111 transmits the second video and audio signal to the receiver device 120 through the wireless module 112.

In step S250, the processing unit 111 determines whether the HDMI transmission cable 101 is again coupled to the image providing device 130. If not, the processing unit 111 may perform step S250 again after a second preset time period to periodically determine whether the HDMI transmission cable 101 is plugged again. If yes, the processing unit 111 performs step S220 to reselect to use the first conversion unit 114. Therefore, the transmitter device 110 provided in this embodiment may effectively prevent the situation that the image is interrupted by mistakenly unplugging or disconnecting the HDMI transmission cable 101, for instance.

In addition, in other embodiments of the disclosure, before the transmitter device 110 is coupled to the image providing device 130 through the HDMI transmission cable 101, when the transmitter device 110 is coupled to the image providing device 130 through the Type-C transmission cable 102, and when the processing unit 111 determines that the image providing device 130 does not have the function of transmitting the second video and audio stream through the Type-C transmission cable 102, the transmitter device 110 generates an indication signal. Here, the indication signal may be, for instance, implemented in form of a speaker, a buzzer, and/or a light emitting unit disposed on the transmitter device 110 to generate an indication sound and/or indication light, so as to effectively remind the user of further coupling the HDMI transmission cable 101 to the transmitter device 110 and the image providing device 130 to perform the video and audio streaming functions.

To sum up, the transmitter device provided in one or more embodiments of the disclosure may be coupled to the image providing device through HDMI transmission cable and Type-C transmission cable to obtain video and audio stream and the power signal from the image providing device. The transmitter device provided in one or more embodiments of the disclosure may preferentially select the video and audio stream transmitted through the HDMI transmission cable to generate the corresponding video and audio signal and provide the video and audio signal to the receiver device through wireless communication. The transmitter device provided in one or more embodiments of the disclosure may obtain at least the power signal provided by the image providing device through the Type-C transmission cable, so that the transmitter device may obtain power. The transmitter device provided in one or more embodiments of the disclosure may still perform video and audio streaming functions through the Type-C transmission cable even though the HDMI transmission cable is not effectively connected between the transmitter device and the image providing device.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A transmitter device, adapted to be coupled to an image providing device and a receiver device, wherein the transmitter device comprises:

a first conversion circuit, configured to be coupled to the image providing device through an HDMI transmission cable to receive a first video and audio stream provided by the image providing device;

a second conversion circuit, configured to be coupled to the image providing device through a Type-C transmission cable to receive a second video and audio stream provided by the image providing device;

a wireless circuit, connected to the receiver device through wireless communication; and a processor, coupled to the first conversion circuit, the second conversion circuit, and the wireless circuit, wherein the processor preferentially selects the first conversion circuit to receive a first video and audio signal output by converting the first video and audio stream by the first conversion circuit, and the processor transmits the first video and audio signal to the receiver device through the wireless circuit, wherein the processor notifies the second conversion circuit of stopping receiving the second video and audio stream provided by the image providing device through the Type-C transmission cable.

2. The transmitter device according to claim 1, further comprising:

a power circuit, coupled to the processor and the second conversion circuit, wherein the processor enables a power channel of the Type-C transmission cable through the second conversion circuit, so that the second conversion circuit obtains a power signal from the image providing device through the power channel, and the processor provides the power signal to the power circuit, so that the transmitter device obtains power through the Type-C transmission cable.

3. The transmitter device according to claim 1, wherein the processor respectively provides first extended display ability identification data and second extended display ability identification data to the image providing device through the HDMI transmission cable and the Type-C transmission cable, respectively, so that the image providing device provides the first video and audio stream and a second video and audio stream respectively through the HDMI transmission cable and the Type-C transmission cable according to the first extended display ability identification data and the second extended display ability identification data.

4. The transmitter device according to claim 1, wherein the processor further notifies the second conversion circuit of not converting the second video and audio stream into a second video and audio signal.

5. The transmitter device according to claim 1, wherein the second conversion circuit converts the second video and audio stream into a second video and audio signal and provides the second video and audio signal to the processor, wherein the processor does not provide the second video and audio signal to the wireless circuit.

6. The transmitter device according to claim 1, further comprising:

a first switch, coupled between the processor and the second conversion circuit, wherein the processor operates the first switch to cut off a first signal transmission path configured to transmit the second video and audio signal between the processor and the second conversion circuit.

7. The transmitter device according to claim 1, further comprising:

a second switch, coupled between the processor and the wireless circuit, wherein the processor operates the second switch to cut off a second signal transmission path configured to transmit the second video and audio signal between the processor and the wireless circuit.

8. The transmitter device according to claim 1, wherein when the processor determines that the HDMI transmission cable is unplugged and not coupled to the image providing device, the processor selects the second conversion circuit to receive a second video and audio signal output by converting the second video and audio stream by the second conversion circuit, and the processor transmits the second video and audio signal to the receiver device through the wireless circuit.

9. The transmitter device according to claim 1, wherein before the transmitter device is coupled to the image providing device through the HDMI transmission cable, when the transmitter device is coupled to the image providing device through the Type-C transmission cable, and when the processor determines that the image providing device does not have a function of transmitting the second video and audio stream through the Type-C transmission cable, the transmitter device generates an indication signal.

* * * * *